US007591361B2

(12) United States Patent
McGunn et al.

(10) Patent No.: US 7,591,361 B2

(45) Date of Patent: Sep. 22, 2009

(54) HORIZONTAL COIN DISPENSER

(75) Inventors: Edward J. McGunn, Posen, IL (US); James Ivey, III, Posen, IL (US); Eduardo DeCastro Barcellos, Posen, IL (US); Warren Bittencourt Oliveira, Posen, IL (US)

(73) Assignee: Corporate Safe Specialists, Inc., Posen, IL (US)

( * ) Notice: Subject to any disclaimer, the term of this patent is extended or adjusted under 35 U.S.C. 154(b) by 1136 days.

(21) Appl. No.: 10/623,624

(22) Filed: Jul. 21, 2003

(65) Prior Publication Data

US 2005/0016814 A1 Jan. 27, 2005

(51) Int. Cl.

| | |
|---|---|
| ***G07F 9/08*** | (2006.01) |
| ***G06F 7/00*** | (2006.01) |
| ***G06F 9/00*** | (2006.01) |
| ***G06F 19/00*** | (2006.01) |

(52) U.S. Cl. .......................... 194/216; 194/217; 453/1; 453/2; 453/16; 453/58; 453/61; 221/196; 221/263

(58) Field of Classification Search ................. 221/266, 221/263, 196, 6; 211/59.3, 59.2; 312/348.3, 312/61, 71; 194/216–224, 244, 246; 453/1, 453/2, 16, 17, 58–62

See application file for complete search history.

(56) References Cited

U.S. PATENT DOCUMENTS 4,269,326 A * 5/1981 Delbrouck .................. 221/227
4,367,760 A 1/1983 Thomas et al.
4,469,245 A 9/1984 Fish et al.
4,850,511 A 7/1989 Kral et al.
5,005,339 A 4/1991 Capawana
5,092,816 A * 3/1992 Levasseur .................... 453/17
5,205,436 A * 4/1993 Savage .......................... 221/7
5,722,564 A 3/1998 Tiraboschi
5,768,965 A * 6/1998 Gonzalez et al. .............. 83/440
5,830,055 A 11/1998 Jones et al.
6,109,059 A * 8/2000 Lebrun ...................... 62/457.5
6,220,463 B1 * 4/2001 Pullen ........................ 211/186
6,261,169 B1 * 7/2001 Ishida et al. .................. 453/17
6,269,285 B1 * 7/2001 Mignault .................... 700/236
6,302,294 B1 10/2001 Collier et al.
6,415,953 B1 * 7/2002 O'Brien et al. ............. 221/196

(Continued)

FOREIGN PATENT DOCUMENTS

JP 11-250314 * 9/1999

OTHER PUBLICATIONS

Merriam-Webster's Collegiate Dictionary, 10th ed., 1998, pp. 352 and 1079.*

*Primary Examiner*—Jeffrey A Shapiro
(74) *Attorney, Agent, or Firm*—Wood, Phillips, Katz, Clark & Mortimer

(57) ABSTRACT

A coin dispensing system comprises a drawer including a bottom wall connected to opposite sidewalls, and a plurality of spaced dividers between the opposite sidewalls defining a plurality of columns for supporting vertical tubes of currency. A plurality of dispensers, one for each column, are provided each for withdrawing tubes of currency from an associated column. A plurality of sensors, one for each column, are provided each for sensing quantity of tubes in the associated column. A control system is operatively associated with the sensors for determining quantity of currency in the drawer.

20 Claims, 7 Drawing Sheets

U.S. PATENT DOCUMENTS

| | | | | |
|---|---|---|---|---|
| 6,539,280 | B1 * | 3/2003 | Valiulis et al. | 700/236 |
| 6,638,157 | B2 * | 10/2003 | Perkitny | 453/13 |
| 6,934,688 | B2 * | 8/2005 | Carter | 705/11 |
| 2003/0141265 | A1 * | 7/2003 | Jo et al. | 211/59.3 |
| 2004/0220859 | A1 * | 11/2004 | McGunn et al. | 705/16 |
| 2008/0078143 | A1 * | 4/2008 | Uehara et al. | 53/212 |

* cited by examiner

HORIZONTAL COIN DISPENSER

FIELD OF THE INVENTION

This invention relates to currency vending and, more particularly, to a horizontal coin dispensing system.

BACKGROUND OF THE INVENTION

Currency is often stored in tubular devices. Most commonly, a roll of coins is held in a paper tube. Occasionally, paper currency may also be stored in a tube.

A retail establishment typically receives rolls of coins from the bank for use in day to day operation. Typically, the rolls are stored in a safe in vertical stacks. Openings are provided at the top of the safe through which a user can insert a dipstick to determine number of rolls in each stack. This requires the user to insert the dipstick in each of a plurality of slots to determine the number of rolls in each vertical stack. The user must also know the denomination of the coin in each stack to determine the total amount of currency available in the safe.

Rolls of coins are dispensed in this application by opening the safe and withdrawing select rolls from within the safe. Thereafter, the dipstick must again be used to determine number of rolls in each stack, without opening the safe. Particularly, the safe is not adapted to automatically monitor the amount of currency available, both overall and in each select denomination. Likewise, there is no control for the amount of currency withdrawn and an identification of the user withdrawing the currency.

The present invention is directed to solving one or more of the problems discussed above in a novel and simple manner.

SUMMARY OF THE INVENTION

In accordance with the invention there is described a horizontal coin dispensing system.

Broadly, a coin dispensing system comprises a drawer for supporting vertical tubes of currency. Means are provided for withdrawing tubes of currency from the drawer. A sensor senses quantity of tubes in the drawer. A control system is operatively associated with the sensor for determining quantity of currency in the drawer.

It is a feature of the invention that the drawer comprises a horizontal bottom wall connected to opposite side walls, and a plurality of spaced dividers between the opposite sidewalls defining a plurality of columns for receiving vertical tubes of currency.

It is another feature of the invention to provide a pushing plate in each column and bias means for biasing each pushing plate toward the withdrawing means. It is still another feature of the invention that the sensor comprises a sensing element for sensing position of each pushing plate.

It is still another feature of the invention that the withdrawing means comprises a semi-cylindrical housing for receiving a vertical tube of currency and means for rotating the housing for dispensing the vertical tube of currency.

It is yet another feature of the invention that the control system stores information representing value of currency in each vertical tube of currency and determines quantity of currency in the drawer responsive to the sensed quantity and the stored information.

There is disclosed in accordance with another aspect of the invention a coin dispensing system comprising a drawer including a bottom wall connected to opposite sidewalls, and a plurality of spaced dividers between the opposite sidewalls defining a plurality of columns for supporting vertical tubes of currency. A plurality of dispensers, one for each column, are provided each for withdrawing tubes of currency from an associated column. A plurality of sensors, one for each column, are provided each for sensing quantity of tubes in the associated column. A control system is operatively associated with the sensors for determining quantity of currency in the drawer.

It is a feature of the invention to provide a plurality of pushing plates, one for each column, and bias means for biasing each pushing plate toward an associated dispenser. Each sensor may comprise a sensing element for sensing position of each pushing plate.

It is another feature of the invention that the control system stores information representing value of currency in each vertical tube of currency in each column and determines quantity of currency in the drawer responsive to the sensed quantity and the stored information. The control system may include a display displaying quantity of vertical tubes of currency in each column and value of currency in each column.

It is still another feature of the invention to provide a plurality of biased pushing plates, one for each column, and each sensor comprises a magnet on one of the pushing plates and a plurality of magnet operated switches spaced along the associated column to sense position of the pushing plate. The control system comprises a resister network for each column electrically connected to the plurality of magnet operated switches for the associated column so that the voltage of the resister network varies with position of the pushing plate. The control system detects the voltage for each resister network.

There is disclosed in accordance with yet another aspect of the invention a coin dispensing system comprising a drawer including a bottom wall connected to opposite sidewalls, and a plurality of spaced dividers between the opposite sidewalls defining a plurality of columns for supporting vertical tubes of currency. A plurality of pushing plates, one for each column, are provided and biasing means for biasing each pushing plate forward. A magnet is provided on each of the pushing plates. A plurality of magnet operated switches are spaced along each column to sense position of the associated magnet. A plurality of impedance networks, one for each column, are each electrically connected to the plurality of magnet operated switches for the associated columns with a voltage of the impedance network varies with position of the associated pushing plate. A control system is operatively associated with the impedance network for determining quantity of currency in the drawer.

Further features and advantages of the invention will be readily apparent from the specification and from the drawings.

DETAILED DESCRIPTION OF THE INVENTION

Figure 1:
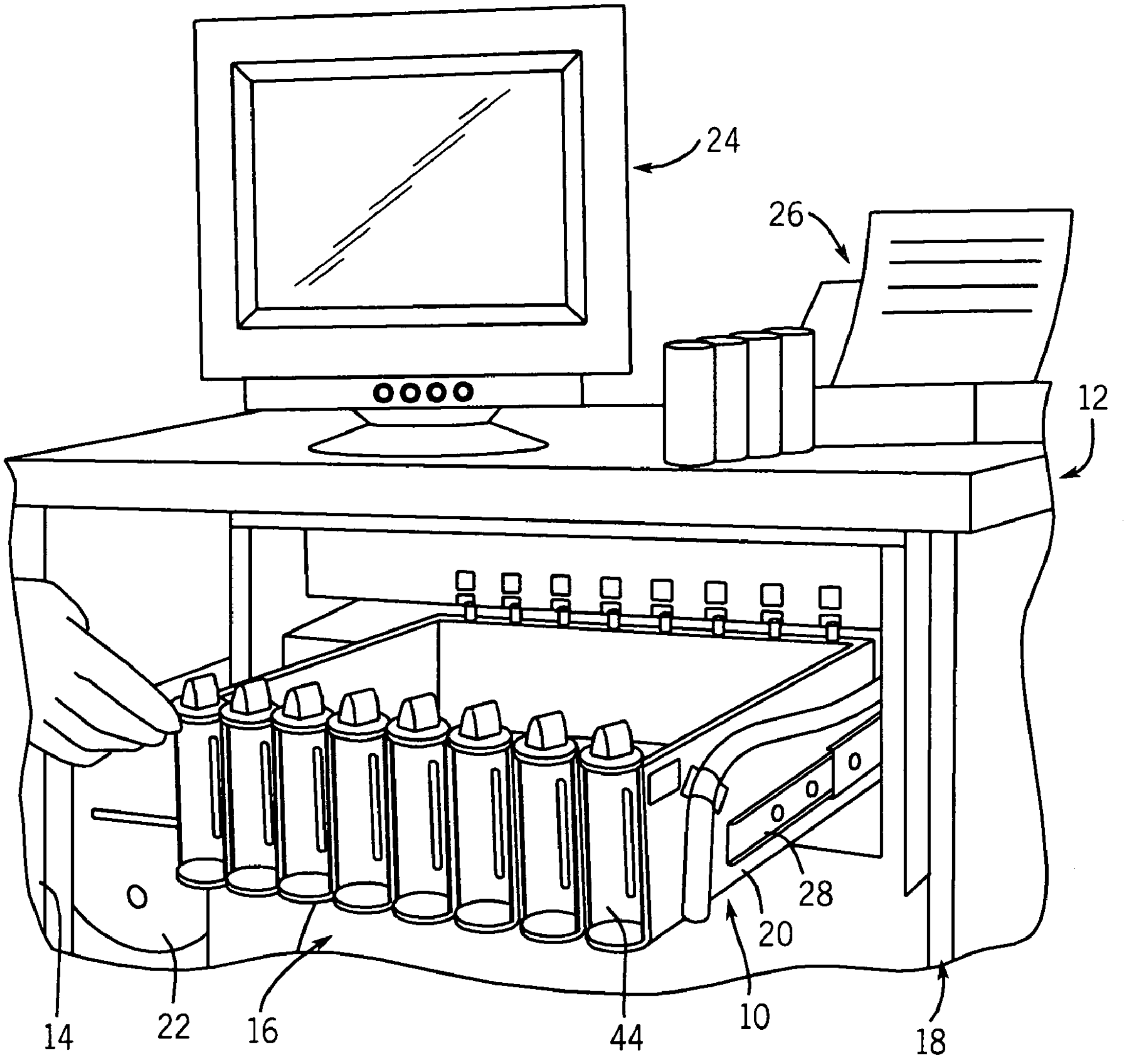
FIG. 1 is a perspective view of a coin dispensing system in accordance with the invention mounted in a safe.

Referring to FIG. 1, a coin dispensing system 10 in accordance with the invention is illustrated installed in a safe 12. The safe 12 comprises an enclosure 14 having an interior space 16 selectively closed with a door 18. A lock (not shown) selectively locks the door 18 in a closed position to restrict access to the interior space 16.

The coin dispensing system 10 comprises a drawer 20, a personal computer 22, a video monitor 24 and a printer 26. The drawer 20 is slidably received in the safe 14 with conventional sliding rails 28.

Figure 2:
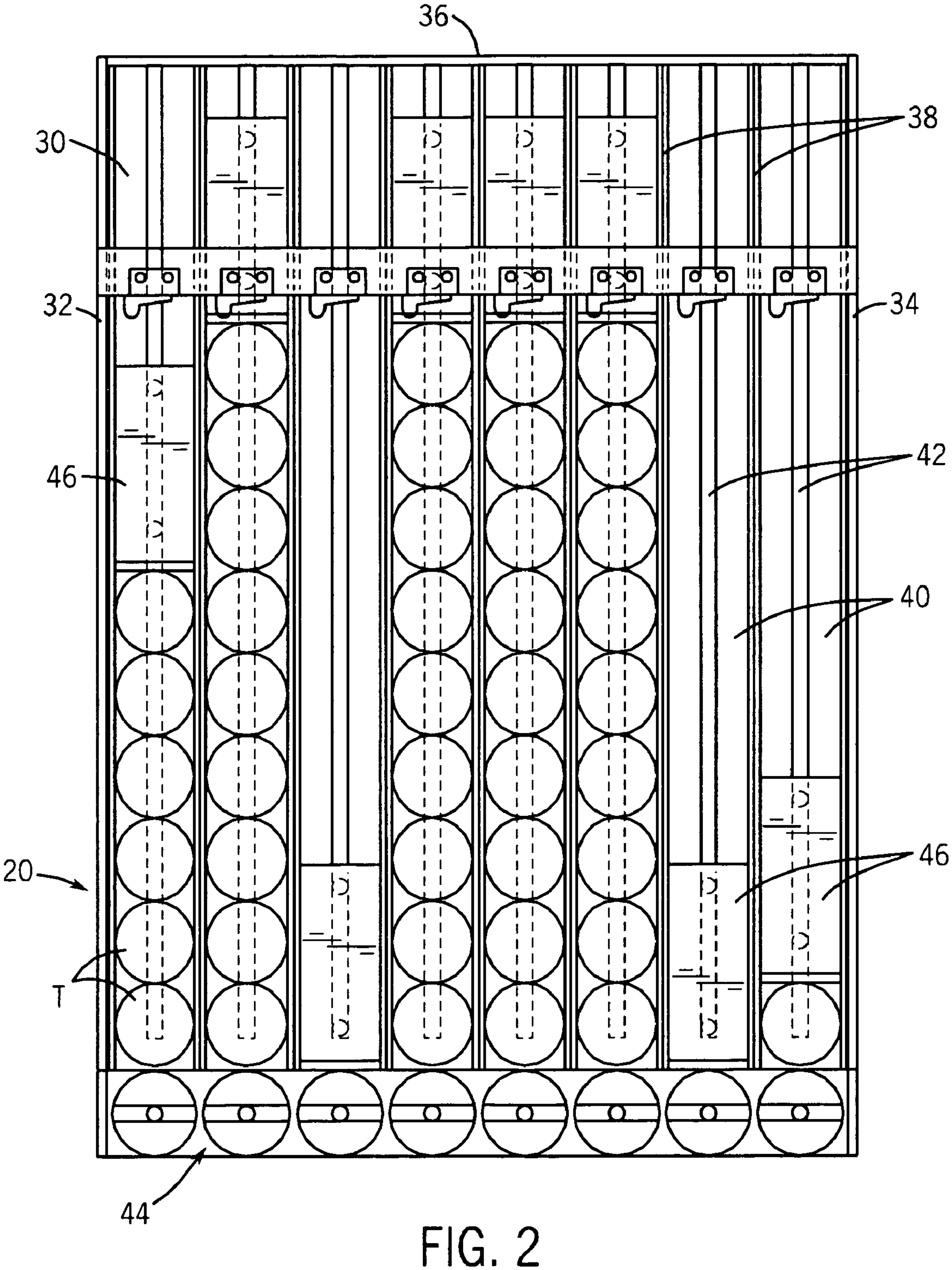
FIG. 2 is a plan view of a drawer of the dispensing system of FIG. 1.

Referring to FIG. 2, the drawer 20 comprises a bottom wall 30 connected to opposite sidewalls 32 and 34. A back wall 36 is connected between the sidewalls 32 and 34. Seven spaced dividers 38 are provided between the opposite sidewalls 32 and 34 to define eight columns 40 for receiving vertical tubes T of currency. A slot 42 is provided in the bottom wall for each column 40 extending from the back wall 36 forwardly to a dispenser 44. A pushing plate 46 is provided in each column and rides in the slot 42. The pushing plates 46 are biased, as described below, to push the tubes T forwardly toward the dispenser 44.

Figure 3:
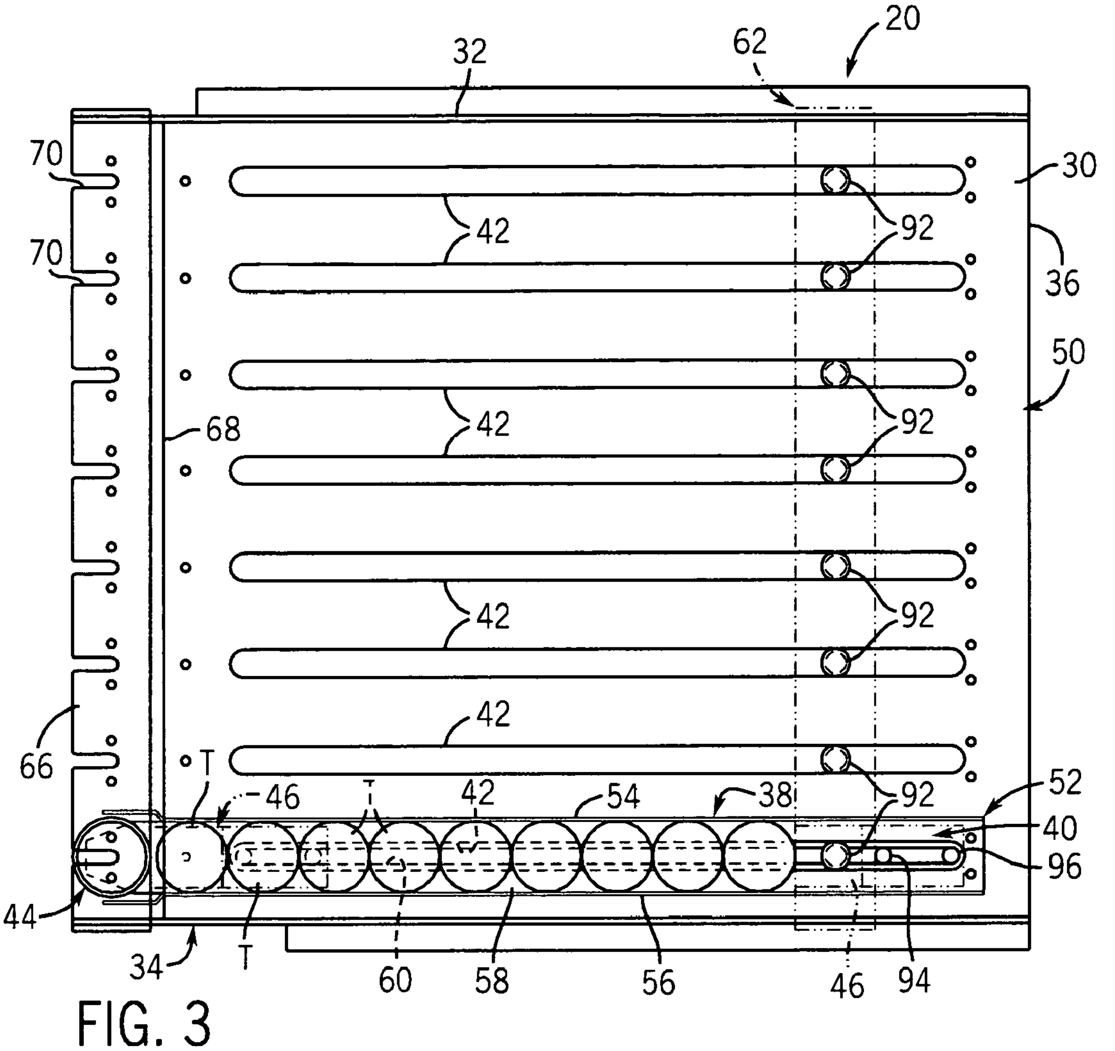
FIG. 3 is a plan view of the drawer of FIG. 2 with parts removed for clarity.
Figure 4:
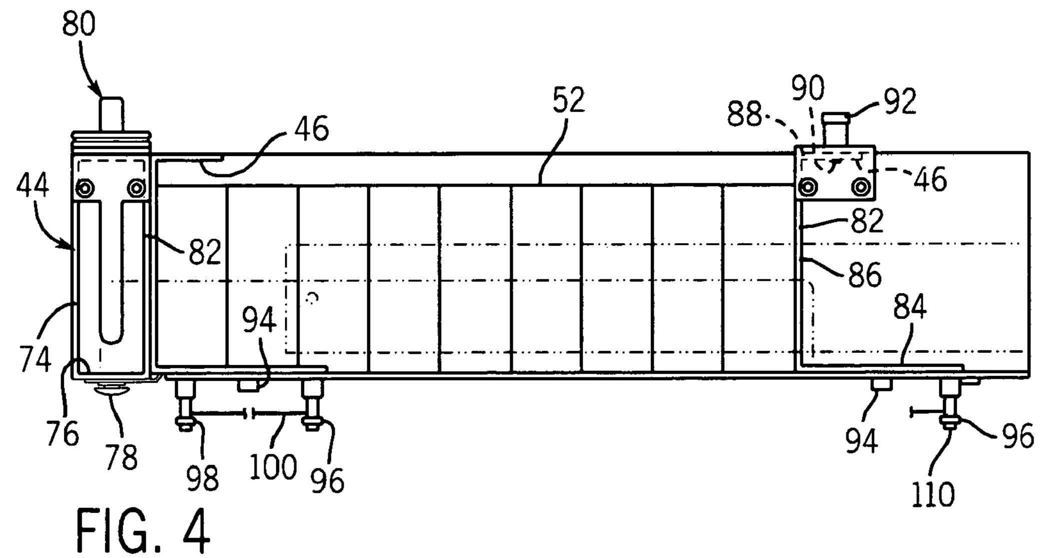
FIG. 4 is a side view of the drawer of FIG. 3.

Referring to FIGS. 3 and 4, the horizontal coin drawer 20 is illustrated in greater detail. Parts are removed for clarity of explanation herein. A coin drawer body 50 comprises the bottom wall 30 and opposite sidewalls 32 and 34. The bottom wall 30 includes the eight elongate slots 42 spaced from one another between the sidewalls 32 and 34. A plurality of tube guides 52, one for each column and one of which is shown, are mounted to the drawer body 50. Each tube guide 52 is generally U-shaped in cross section and includes opposite sidewalls 54 and 56 connected by a bottom wall 58 having an elongate slot 60. Each tube guide 52 is fastened to the bottom wall 30 overlying a slot 42 so that the tube guide slot 60, which has a narrower width, is position over one of the bottom wall elongate slots 42, as shown in FIG. 3. As is apparent, eight of the tube guides 52 are mounted to the drawer body 50 with the sidewalls 54 and 56 of adjacent tube guides together defining the dividers 38 shown in FIG. 2.

A tube release bar 62 extends across and atop the sidewalls 32 and 34 spaced forwardly of the rear wall 36. A tube holder bar 66 is mounted between the sidewalls 32 and 34 forwardly of a front edge 68 of the bottom wall 30. The tube holder bar 66 includes a plurality of slots 70. Each slot 70 rotationally receives one of the dispensers 44. The dispenser 44 comprises a semi-cylindrical housing 74 having a bottom wall 76. A fastener 78 secured to the bottom wall 76 is received in the slot 70 to allow for rotation of the dispenser 44 by turning a knob 80. Particularly, the knob 80 can be turned so that the semi-cylindrical housing 74 is open to the rear to receive a tube T and then can be rotated 180 degrees so that the tube T can be withdrawn from the dispenser 44.

Each tube guide 52 slidably receives one of the pushing plates 46. The pushing plate 46 is illustrated in two extreme positions in FIGS. 3 and 4. The first position, represented by solid lines, shows the pushing plate 46 in the rear most position. The second illustrated position, represented by dotted lines, shows the pushing plate 46 in the forward most position. The particular position of the pushing plate 46 depends on the number of tubes T in the column 40. The pushing plate 46 comprises a J-shaped slide member 82 having a bottom wall 84, connecting a vertical wall 86 in turn connecting a shorter top wall 88. The top wall 88 includes an opening 90 for selectively receiving a tool holder element 92 mounted to the tube holder release bar 62. A retaining shaft 94 extends downwardly from the bottom wall 84. A rear spring holder 96 also extends downwardly from the bottom wall 84 spaced from the shaft 94 opposite the vertical wall 86. The shaft 94 and spring holder 96 extends through the slots 60 and 42, as shown. A front spring holder 98 is mounted to the bottom wall 30 forwardly of the slot 42. A spring 100 extends between the front spring holder 98 and the rear spring holder 96. As such, the spring 100 biases the pushing plate 46 forwardly toward the dispenser 44. To fill the column 40, the pushing plate 46 is pushed to the rear most position shown in FIG. 4, with the tube holder 92 extending into the pusher plate top opening 90 to hold the same. Up to nine vertical tubes T can then be supported by the tube guide 52 and thus the horizontal bottom wall 30 in the column 42. The tube holder 92 can then be lifted to release the pushing plate 46 which then biases the tubes T forwardly toward the dispenser 44. As is apparent, as the dispenser 44 is selectively rotated by the knob 80 to withdraw a tube T, and then turned so that the opening faces rear and the pushing plate 46 pushes the tubes T forwardly. Although not specifically shown in FIG. 3, each column 40 is identical in construction, as is generally shown in FIG. 2.

Figure 5:
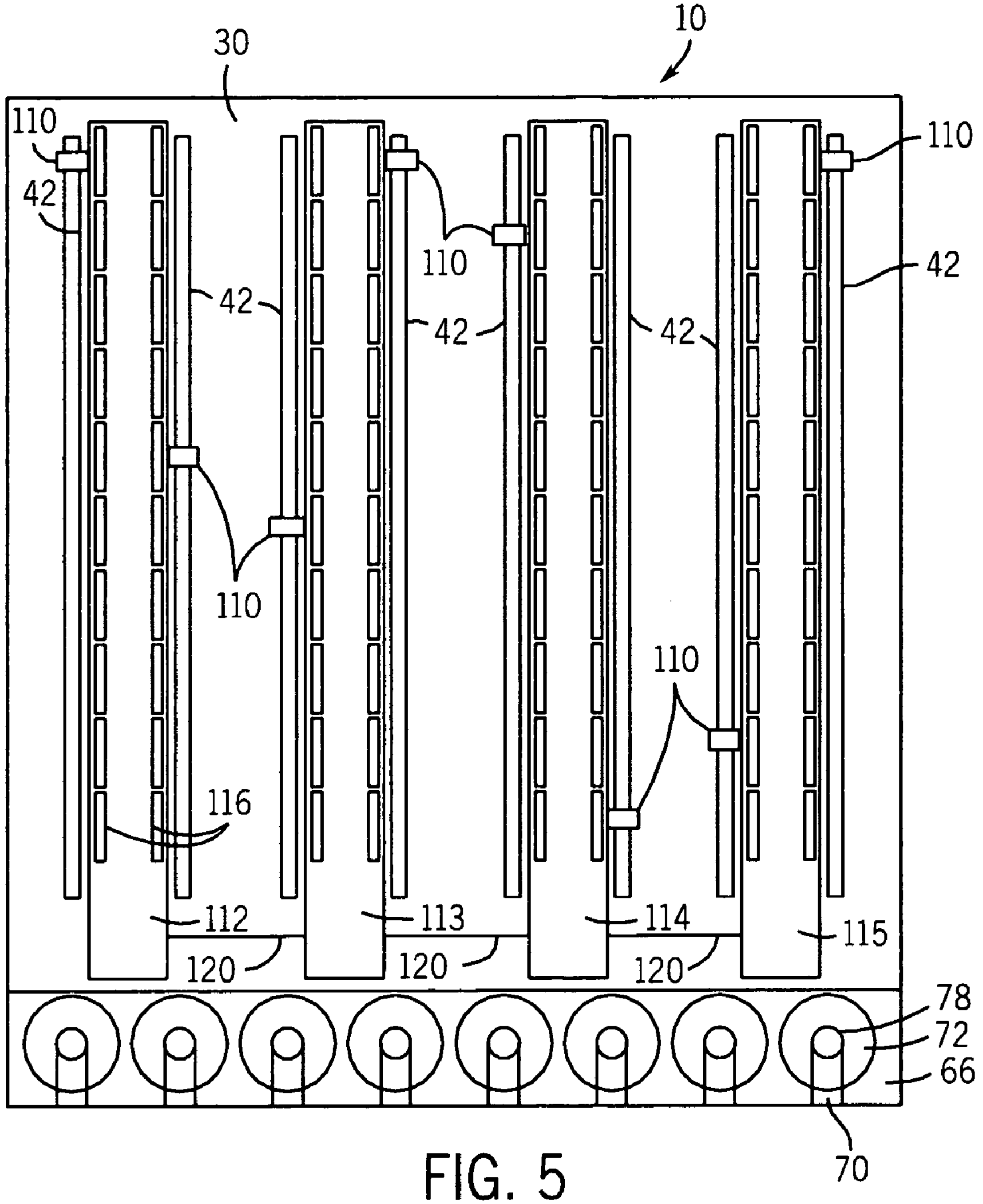
FIG. 5 is a bottom plan view of the drawer of FIG. 2.

Referring to FIG. 5, the underside of the bottom wall 30 is illustrated. A magnet 110 is slidable along each slot 42. Particularly, each magnet 110 is operatively associated with one of the pushing plates 46. For example, the magnet 110 may be secured to the rear spring holder 96, as illustrated in FIG. 4, or to the shaft 94 or to the bottom plate 84. The coin dispensing system 10 includes four circuit boards 112, 113, 114 and 115. Each circuit board 112-115 is associated with two magnets 110, and thus two columns 40. Each column 40 is capable of holding nine coin tubes T. Each circuit board 112-115 is generally identical in construction and only one is described in detail herein. The circuit board 112 is of a length corresponding to length of the bottom wall 30 and a width to fit between a pair of adjacent slots 42. The circuit board 112 includes twenty magnetic switches 116, such as reed switches. Ten of these magnetic switches 116 are aligned in a row along one longitudinal edge. The other ten magnetic switches 116 are aligned in a row along the opposite longitudinal edge. As such, each row of magnetic switches 116 is aligned with one of the slots 42. Each magnet 110 slides along an associated row of magnetic switches 116, as generally shown in FIG. 5.

Figure 6:
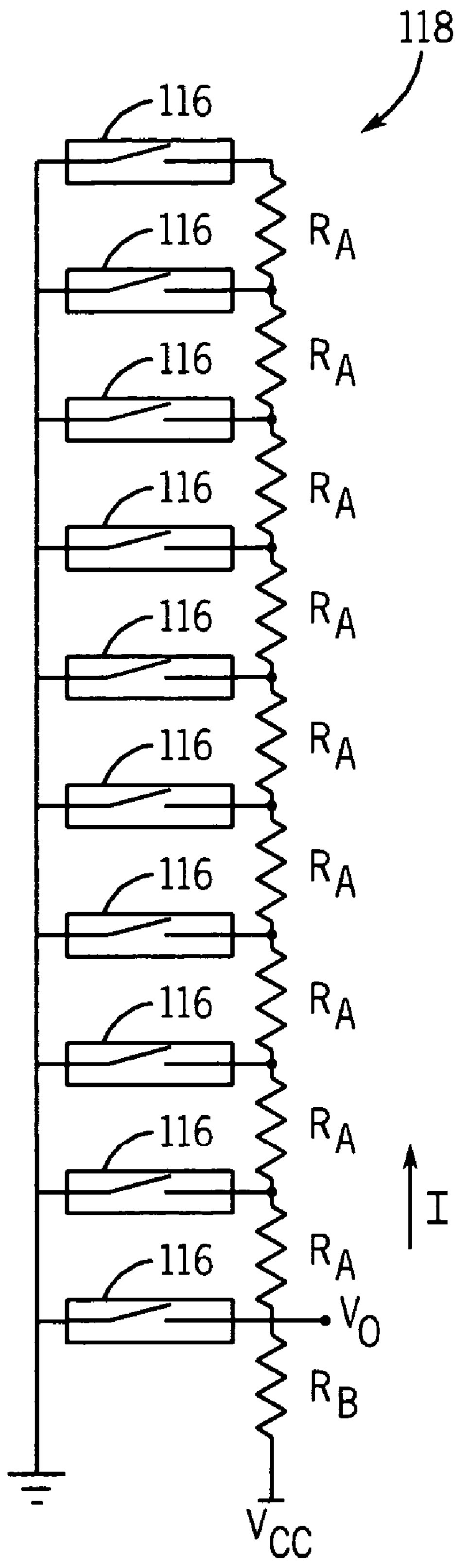
FIG. 6 is an electrical schematic for a sensing circuit for the coin dispensing system of FIG. 1.

Referring also to FIG. 6, an impedance or resistor network 118 is associated with each magnet 110, and thus column 40. The resistor network 118 comprises nine series connected sensing resisters $R_A$ and a tenth series connected bias resister $R_B$. The ten resistors are connected in series between ground and supply $V_{CC}$. The ten magnetic switches 116 are each connected between ground and one of the junctions between the series connected resistors, with the last magnetic switch 116, labeled N=9, connected between ground and the top most resistor in the network 118. An output signal $V_O$ is taken from the junction between the bias resister $R_B$ and the first sensing resister $R_A$ (N=0).

With the described circuit, $V_{CC}$ defines the point of highest potential in the circuit. N defines the position of the pusher plate 46, which is the same as the position of the last tube T in the column 40, represented by the position of the magnet 110. I defines the electrical current that crosses the series resistor network 118.

The magnet 110 will be in the acting range of one of the magnetic switches 116, labeled N=0-N=9, closing the particular switch 116 and setting the voltage at that node of the resistor network 118 equal to zero. This will effect the current I, as defined in the equation:

$$I = \frac{Vcc}{R_A + N \cdot R_B}$$

This will cause a voltage drop at $R_B$, affecting the solution voltage Vo as defined by:

$$V_o = Vcc - I \cdot R_B$$

Replacing I on the equation above, and assuming that $V_{(t)}$ =Vo, since the solution voltage is a function of time, the final solution is as shown:

$$V_{(t)} = Vcc - \frac{Vcc}{R_B + N \cdot R_A} \cdot R_B$$

Figure 7:
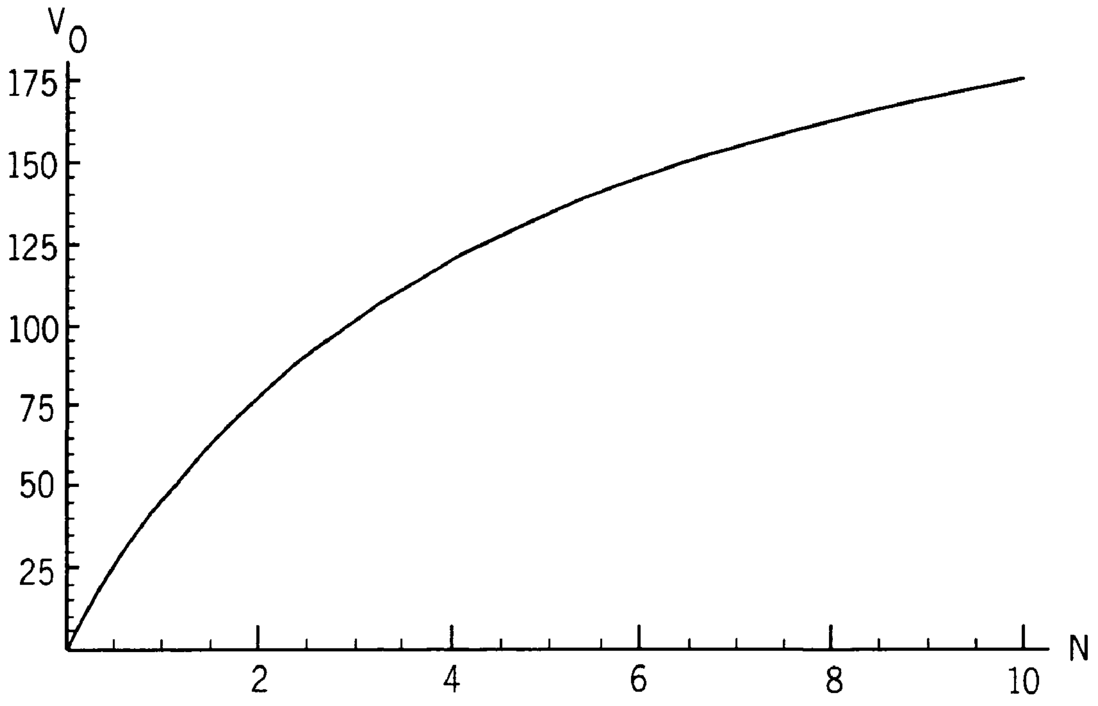
FIG. 7 is a curve illustrating output voltage from the sensing circuit of FIG. 6.

As a result, the resistor network 118 returns a voltage proportional to N, which is the position of the last tube T in the column. As such, the resistor network 118 in combination with the magnet 110 operates as a sensor for sensing quantity of tubes in the column. The preferred option for network precision is to have one different value of resistance for each resistor $R_A$. However, two parameters should be observed when finding values for $R_A$ and $R_B$. First, the system will be assembled by hand, and using ten different values of resistors may elevate the assembly problems by human mistake. Second, in mass quantity purchases, the price drops dramatically for the more units of the same resistor purchased. Having ten different values would divide this price advantage by up to ten. To provide for uniformity, the sensing resistors are $R_A$ are selected to all be of the same value. The bias resistor $R_B$ could also be of the same value. However, the voltage increments become much smaller as N increases above four. Advantageously, the values of the solutions for N must be as far apart as possible. Therefore, the bias resister $R_B$ is selected to have a higher value. For example, the sensing resisters $R_A$ may be on the order of 2,200 ohms, while the bias resister $R_B$ may be on the order of 10,000 ohms. Doing so provides a curve as illustrated in FIG. 7 showing output voltage $V_o$ on the vertical axis, and switch number N on the horizontal axis. As is apparent, different values could be selected.

Figure 8:
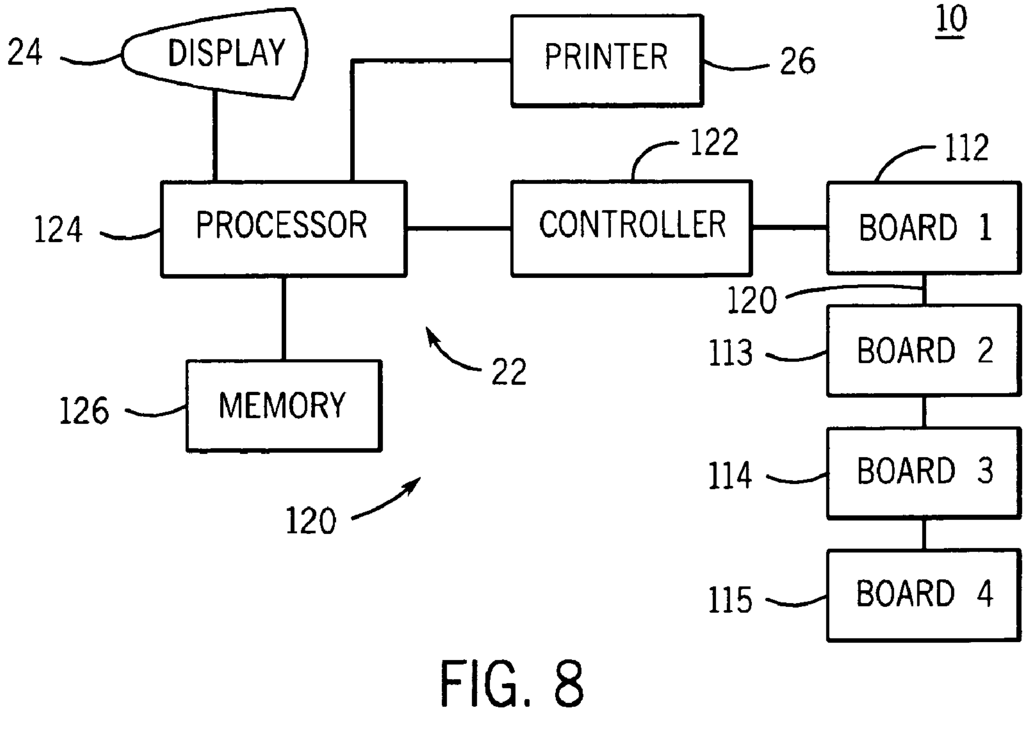
FIG. 8 is a block diagram of a control system for the coin dispensing system of FIG. 1.

Referring to FIG. 8, a block diagram illustrates a control system 120 for the coin dispensing system 10. Each of the circuit boards 112-115 includes two of the circuits illustrated in FIG. 6. The second, third and fourth boards, 113, 115 and 115, include only the magnetic switches 116 and resistor networks 118 and are interconnected by a ten wire flat cable 120. A controller 122 is operatively connected to the circuit boards 112-115. Advantageously, the controller 112 may be located on the first circuit board 112. The controller 112 senses the output voltages Vo from each of the eight resistor networks 118 to provide information to the user.

The controller 122 is connected to the personal computer 22 including a processor 124 and memory 126. The memory 126 stores data and programs for operation. The processor 124 is in turn connected to the display 24 and printer 26.

Figure 9:
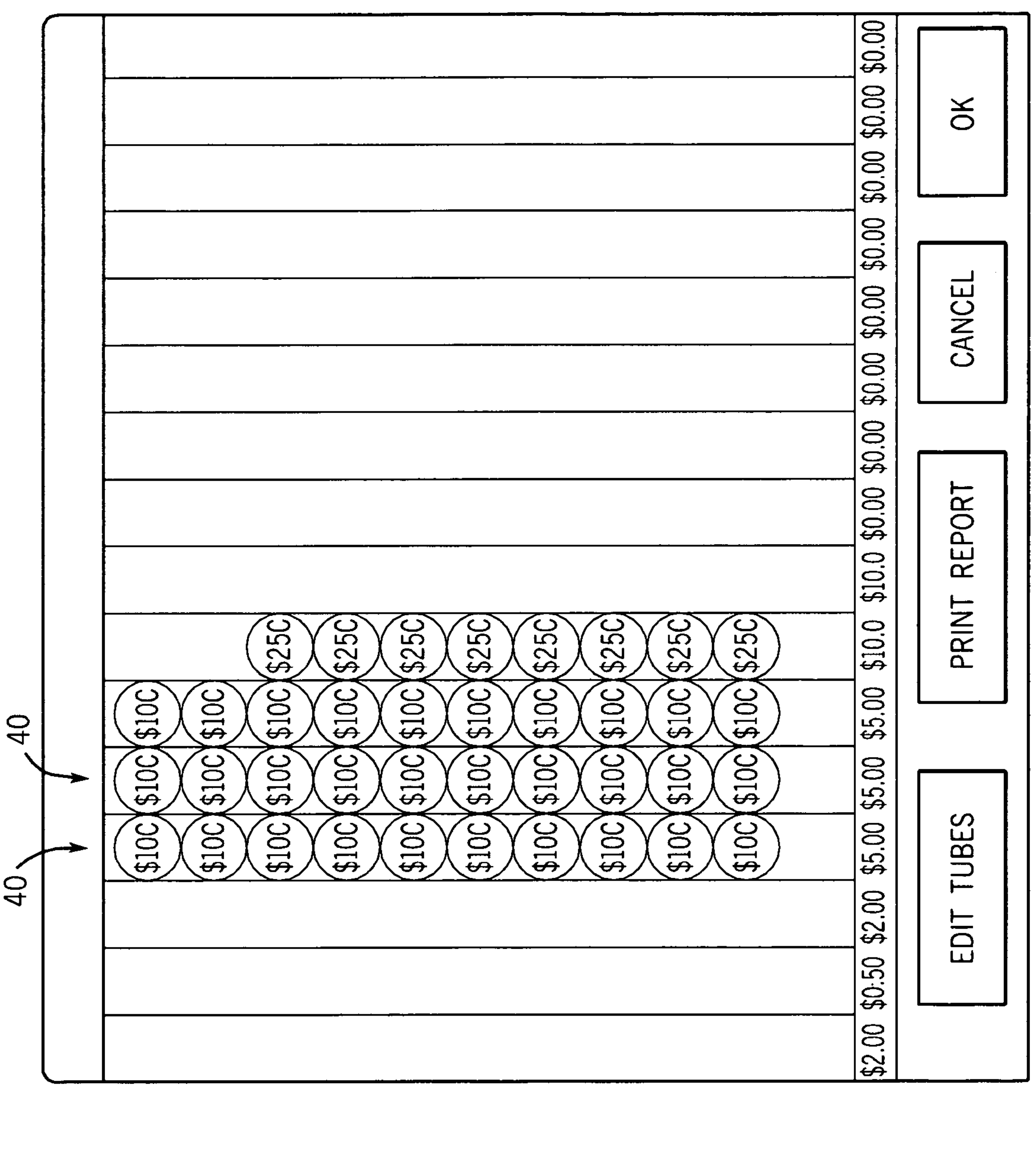
FIG. 9 is a graphical display provided on a video monitor for the coin dispensing system of FIG. 1.

The personal computer 22 may include software for operating the safe 12 such as opening and closing the lock and monitoring the operation of the safe. These operations may be as described in co-pending application Ser. No. 09/982,348, filed Oct. 18, 2001, owned by the assignee of the present application, the specification of which is incorporated by reference herein. Additionally, the personal computer 22 includes software for determining quantity of currency in the drawer by communicating with the controller 122 to determine the position of each of the magnets 110, representing number of tubes T in each column and multiplying the number with user returned data representing the value of each tube T. The personal computer 22 generates a graphic image to be displayed on the display 24, as shown in FIG. 9. The illustrated graphic display comprises a "virtual dipstick". This allows the user to view the amount of tubes T loaded in the drawer 20 and edit the amount of money each tube is worth, provided the user has appropriate security rights. The illustrated display gives a quick glance at the amount of tubes loaded in the drawer 20 in each column 40 and the total value in each column 40. At the bottom of the screen, the user has an option to print a report of loaded tubes and the option to edit the columns to identify the denomination and quantity of currency in each tube T. The edit tubes button allows the user to edit the value of money that is to be loaded in each tube. To change the value of a column, the column number is selected in a drop down menu visible after edit tubes is selected or the user can click on the column to be edited. The value of the column can be edited only if the column is empty.

In conjunction with the incorporated safe monitoring system, the user will use an open door screen to remove and refill the tubes T. To remove a tube, the tube T user would open the door 18 behind which is located the cash tube drawer 20 and turn the appropriate dispenser 44. The user can remove as many tubes as needed and every transaction is recorded in the system by sensing the change in the number of tubes T. To refill the drawer 20, the drawer 20 must be opened as shown in FIG. 1 after opening a lock that is holding the drawer in place.

The present invention has been described with respect to software operation and block diagrams. It will be understood that each block of the block diagrams and the software operation can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

Thus, in accordance with the invention there is described a coin dispensing system which includes a drawer 20 for supporting vertical tubes T of currency. A dispenser 44 for each column 40 provides means for withdrawing tubes T from the drawer 20. A sensor in form of magnetic switches 116 and a resistor network 118 sense quantity of tubes T in the drawer 20. A control circuit in the form of the controller 122 and personal computer 22 determine quantity of currency in the drawer.

We claim:

1. A coin dispensing system comprising:

a drawer for supporting vertical tubes of currency;

means for withdrawing tubes of currency from the drawer;

a sensor for sensing quantity of tubes in the drawer; and a control system operatively associated with the sensor for determining quantity of currency in the drawer.

2. The coin dispensing system of claim 1 wherein the drawer comprises a horizontal bottom wall connected to opposite side walls, and a plurality of spaced dividers between the opposite side walls defining a plurality of columns for receiving vertical tubes of currency.

3. The coin dispensing system of claim 2 further comprising a pushing plate in each column and bias means for biasing each pushing plate toward the withdrawing means.

4. The coin dispensing system of claim 3 wherein the sensor comprises a sensing element for sensing position of each pushing plate.

5. The coin dispensing system of claim 1 wherein the withdrawing means comprises a semi-cylindrical housing for receiving a vertical tube of currency and means for rotating the housing for dispensing the vertical tube of currency.

6. The coin dispensing system of claim 1 wherein the control system stores information representing value of currency in each vertical tube of currency and determines quantity of currency in the drawer responsive to the sensed quantity and the stored information.

7. A coin dispensing system comprising:

a drawer including a bottom wall connected to opposite side walls, and a plurality of spaced dividers between the opposite side walls defining a plurality of columns for supporting vertical tubes of currency;

a plurality of dispensers, one for each column, each for withdrawing tubes of currency from an associated column;

a plurality of sensors, one for each column, each for sensing quantity of tubes in the associated column; and a control system operatively associated with the sensors for determining quantity of currency in the drawer.

8. The coin dispensing system of claim 7 further comprising a plurality of pushing plates, one for each column, and bias means for biasing each pushing plate toward an associated dispenser.

9. The coin dispensing system of claim 8 wherein each sensor comprises a sensing element for sensing position of each pushing plate.

10. The coin dispensing system of claim 7 wherein each dispenser comprises a semi-cylindrical housing for receiving a vertical tube of currency and means for rotating the housing for dispensing the vertical tube of currency.

11. The coin dispensing system of claim 7 wherein the control system stores information representing value of currency in each vertical tube of currency in each column and determines quantity of currency in the drawer responsive to the sensed quantity and the stored information.

12. The coin dispensing system of claim 11 wherein the control system includes a display displaying quantity of vertical tubes of currency in each column and value of currency in each column.

13. The coin dispensing system of claim 7 wherein further comprising a plurality of biased pushing plates, one for each column, and each sensor comprises a magnet on one of the pushing plates and a plurality of magnet operated switches spaced along the associate column to sense position of the pushing plate.

14. The coin dispensing system of claim 13 wherein the control system comprises a resistor network for each column electrically connected to the plurality of magnet operated switches for the associated column so that voltage of the resistor network varies with position of the pushing plate.

15. The coin dispensing system of claim 14 wherein the control system detects the voltage for each resistor network.

16. A coin dispensing system comprising:

a drawer including a bottom wall connected to opposite side walls, and a plurality of spaced dividers between the opposite side walls defining a plurality of columns for supporting vertical tubes of currency;

a plurality of pushing plates, one for each column, and biasing means for biasing each pushing plate forward;

a magnet on each of the pushing plates;

a plurality of magnet operated switches spaced along each column to sense position of the associated magnet;

a plurality of impedance networks, one for each column, each electrically connected to the plurality of magnet operated switches for the associated column so that voltage of the impedance network varies with position of the associated pushing plate; and a control system operatively associated with the impedance networks for determining quantity of currency in the drawer.

17. The coin dispensing system of claim 16 wherein the control system stores information representing value of currency in each vertical tube of currency in each column and determines quantity of currency in the drawer responsive to the sensed quantity and the stored information.

18. The coin dispensing system of claim 17 wherein the control system includes a display displaying quantity of vertical tubes of currency in each column and value of currency in each column.

19. The coin dispensing system of claim 16 further comprising a dispenser for each column comprising a semi-cylindrical housing for receiving a vertical tube of currency and means for rotating the housing for dispensing the vertical tube of currency.

20. The coin dispensing system of claim 16 wherein the impedance network comprises a resistor network.

* * * * *

UNITED STATES PATENT AND TRADEMARK OFFICE

CERTIFICATE OF CORRECTION

PATENT NO. : 7,591,361 B2
APPLICATION NO. : 10/623624
DATED : September 22, 2009
INVENTOR(S) : McGunn et al.

It is certified that error appears in the above-identified patent and that said Letters Patent is hereby corrected as shown below:

Please delete the title page and insert the title page attached

Signed and Sealed this

Twenty-second Day of December, 2009

David J. Kappos

*Director of the United States Patent and Trademark Office*

(12) United States Patent
McGunn et al.

(10) Patent No.: US 7,591,361 B2
(45) Date of Patent: Sep. 22, 2009

(54) HORIZONTAL COIN DISPENSER

(75) Inventors: Edward J. McGunn, Posen, IL (US); James Ivey, III, Posen, IL (US); Eduardo DeCastro Barcellos, Posen, IL (US); Wagner Bittencourt Oliveira, Posen, IL (US)

(73) Assignee: Corporate Safe Specialists, Inc., Posen, IL (US)

( * ) Notice: Subject to any disclaimer, the term of this patent is extended or adjusted under 35 U.S.C. 154(b) by 1136 days.

(21) Appl. No.: 10/623,624

(22) Filed: Jul. 21, 2003

(65) Prior Publication Data

US 2005/0016814 A1 Jan. 27, 2005

(51) Int. Cl.

| | |
|---|---|
| ***G07F 9/08*** | (2006.01) |
| ***G06F 7/00*** | (2006.01) |
| ***G06F 9/00*** | (2006.01) |
| ***G06F 19/00*** | (2006.01) |

(52) U.S. Cl. .......................... 194/216; 194/217; 453/1; 453/2; 453/16; 453/58; 453/61; 221/196; 221/263

(58) Field of Classification Search ................ 221/266, 221/263, 196, 6; 211/59.3, 59.2; 312/348.3, 312/61, 71; 194/216 224, 244, 246; 453/1, 453/2, 16, 17, 58-62

See application file for complete search history.

(56) References Cited

U.S. PATENT DOCUMENTS

| | | | | |
|---|---|---|---|---|
| 4,269,326 A * | 5/1981 | Delbrouck | ................. | 221/227 |
| 4,367,760 A | 1/1983 | Thomas et al. | | |
| 4,469,245 A | 9/1984 | Fish et al. | | |
| 4,850,511 A | 7/1989 | Kral et al. | | |
| 5,005,339 A | 4/1991 | Capawana | | |
| 5,092,816 A * | 3/1992 | Levasseur | .................. | 453/17 |
| 5,205,436 A * | 4/1993 | Savage | ......................... | 221/7 |
| 5,722,564 A | 3/1998 | Tiraboschi | | |
| 5,768,965 A * | 6/1998 | Gonzalez et al. | ............. | 83/440 |
| 5,830,055 A | 11/1998 | Jones et al. | | |
| 6,109,059 A * | 8/2000 | Lebrun | ..................... | 62/457.5 |
| 6,220,463 B1 * | 4/2001 | Pullen | ....................... | 211/186 |
| 6,261,169 B1 * | 7/2001 | Ishida et al. | ................. | 453/17 |
| 6,269,285 B1 * | 7/2001 | Mignault | ................... | 700/236 |
| 6,302,294 B1 | 10/2001 | Collier et al. | | |
| 6,415,953 B1 * | 7/2002 | O'Brien et al. | ............ | 221/196 |

(Continued)

FOREIGN PATENT DOCUMENTS

JP 11-250314 * 9/1999

OTHER PUBLICATIONS

Merriam-Webster's Collegiate Dictionary, 10th ed., 1998, pp. 352 and 1079.*

*Primary Examiner*—Jeffrey A Shapiro
(74) *Attorney, Agent, or Firm*—Wood, Phillips, Katz, Clark & Mortimer

(57) ABSTRACT

A coin dispensing system comprises a drawer including a bottom wall connected to opposite sidewalls, and a plurality of spaced dividers between the opposite sidewalls defining a plurality of columns for supporting vertical tubes of currency. A plurality of dispensers, one for each column, are provided each for withdrawing tubes of currency from an associated column. A plurality of sensors, one for each column, are provided each for sensing quantity of tubes in the associated column. A control system is operatively associated with the sensors for determining quantity of currency in the drawer.

20 Claims, 7 Drawing Sheets

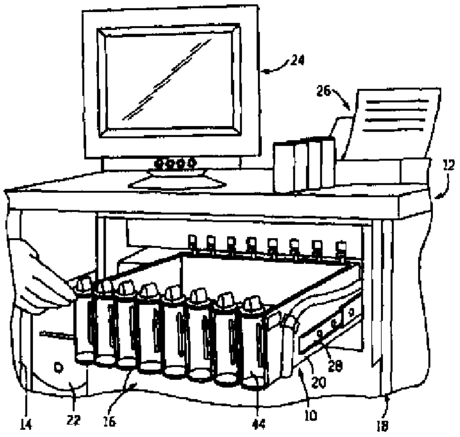

UNITED STATES PATENT AND TRADEMARK OFFICE
CERTIFICATE OF CORRECTION

PATENT NO. : 7,591,361 B2
APPLICATION NO. : 10/623624
DATED : September 22, 2009
INVENTOR(S) : McGunn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1031 days.

Signed and Sealed this

Twenty-first Day of September, 2010

David J. Kappos

*Director of the United States Patent and Trademark Office*